United States Patent
Feng

(10) Patent No.: US 11,346,796 B2
(45) Date of Patent: May 31, 2022

(54) METHOD FOR MEASURING THERMAL DIFFUSIVITY PERFORMANCE AND SYSTEM THEREOF

(71) Applicant: LONG VICTORY INSTRUMENTS CO., LTD., Taoyuan (TW)

(72) Inventor: Chien Chung Feng, Taoyuan (TW)

(*) Notice: Subject to any disclaimer, the term of this patent is extended or adjusted under 35 U.S.C. 154(b) by 0 days.

(21) Appl. No.: 17/033,654

(22) Filed: Sep. 25, 2020

(65) Prior Publication Data

US 2021/0199608 A1 Jul. 1, 2021

(30) Foreign Application Priority Data

Dec. 27, 2019 (TW) ................. 108147974

(51) Int. Cl.
*G01N 25/18* (2006.01)
(52) U.S. Cl.
CPC .................... *G01N 25/18* (2013.01)
(58) Field of Classification Search
CPC .................................................. G01N 25/18
See application file for complete search history.

(56) References Cited

U.S. PATENT DOCUMENTS

| 2011/0308259 A1 | 12/2011 | Wray et al. |
| 2013/0094841 A1 | 4/2013 | Garvey et al. |
| 2014/0190663 A1 | 7/2014 | Wray et al. |
| 2015/0176929 A1 | 6/2015 | Wray et al. |
| 2017/0238365 A1 | 8/2017 | Lilleland et al. |
| 2020/0132235 A1 | 4/2020 | Lilleland et al. |

FOREIGN PATENT DOCUMENTS

WO WO2018055718 A1 3/2018

*Primary Examiner* — Natalie Huls
*Assistant Examiner* — Cynthia L Davis

(57) ABSTRACT

A thermal diffusivity performance measurement system is configured to measure a temperature of a pillar. The thermal diffusivity performance measurement system has a temperature sensor and a calculation unit. The temperature sensor is disposed at the pillar and configured to measure the temperature of the pillar. The calculation unit is configured to calculate a ratio of heat conduction to convection intensity per unit conduction intensity and a dimensionless time based on the measuring results of the temperature sensor. The calculation unit is configured to introduce the ratio of the heat conduction to the convection intensity per unit conduction intensity and the dimensionless time into a first formula as following:

$$\theta(X, \tau) = \cosh(M - MX)\operatorname{sech}(M) + \sum_{n=1}^{N} -\frac{2\lambda_n}{M^2 + \lambda_n^2}\sin(\lambda_n X)e^{-(M^2+\lambda_n^2)\tau}$$

The calculation unit calculates a temperature predictive model after the first formula is solved.

4 Claims, 5 Drawing Sheets

METHOD FOR MEASURING THERMAL DIFFUSIVITY PERFORMANCE AND SYSTEM THEREOF

BACKGROUND OF THE INVENTION

1. Field of the Invention

The invention present invention is in related to a measurement system, more particularly to a method for measuring thermal diffusivity performance and a system thereof.

2. Description of the Prior Art

In the past decades, cooling plans for computers and servers are mostly designed based on under steady-state conditions. Thus, stacked heat sinks made of aluminum or copper are widely used as a heat dissipation solution. However, recently the volume of electronic device continues to shrink so that the heating density is higher. In addition, the stacked heat sink is too large to apply to the miniaturized electronic equipment. Therefore, heat pipe is a batter heat dissipation solution to solve high heat density.

Furthermore, the instantaneous working mode is the mainstream working mode of the mobile phone if small electronic devices (such as mobile phones) use heat pipes as a heat dissipation solution. Thus, it is important to predict instantaneous and steady-state temperature changes.

However, there is no reliable instantaneous temperature prediction method. The instantaneous and steady-state temperature are still measured by long time measurement using device. However, how to establish a temperature prediction program is worth to consider for person having ordinary skill in the art.

SUMMARY OF THE INVENTION

A method for measuring a thermal diffusivity performance and a system thereof is provided. The beneficial effect of the present invention is that the heat diffusivity performance of a heat pipe can be predicted by using simple heat pipe temperature control measuring device to measure instantaneous temperature and steady-state temperature via establishing a calculation equation.

A thermal diffusivity performance measurement system is provided in the present invention, which is configured to measure a temperature of a pillar. The thermal diffusivity performance measurement system has a heater, a temperature sensor and a calculation unit. The heater is to heat the pillar. The temperature sensor is disposed at the heat pipe and used to measure the temperature of the pillar. The calculation unit is connected to temperature sensor. The calculation unit is used to calculate a ratio of heat conduction to convection intensity per unit conduction intensity and a dimensionless time based on a plurality of measuring results of the temperature sensor. The calculation unit introduces the ratio of the heat conduction to the convection intensity per unit conduction intensity and the dimensionless time into a first equation as following:

$$\theta(X,\tau) = \cosh(M-MX)\operatorname{sech}(M) + \sum_{n=1}^{N} -\frac{2\lambda_n}{M^2+\lambda_n^2}\sin(\lambda_n X)e^{-(M^2+\lambda_n^2)\tau}$$

Wherein, $$\lambda_n = \left(n-\frac{1}{2}\right)\pi, \; M = \sqrt{\frac{4h}{kD}}L,$$

X is a dimensionless axial coordinate, $\tau$ is a dimensionless time, N is a positive integer, $\lambda$ is a characteristic value, M is a ratio of the heat conduction to the convection intensity, h is a heat convection coefficient, and k is a heat transfer coefficient, D is a diameter of the cylinder, L is a length of the pillar, t is a time. A temperature predictive model is obtained after the first equation is solved.

In the thermal diffusivity performance measurement system, the range of N is 3~5.

In the thermal diffusivity performance measurement system, calculate the ratio of the heat conduction to the convection intensity after the calculation unit measures an instantaneous temperature and a steady-state temperature of the pillar via the temperature sensor, and then calculate the dimensionless time.

In the thermal diffusivity performance measurement system, the pillar is a heat pipe.

In the thermal diffusivity performance measurement system, the pillar is selected from the group consisting of tubular, rod-shaped, linear and curved; wherein the cross section of the pillar is selected from the group consisting of round, square, and irregular shape.

A diffusivity method for measuring a thermal diffusivity performance is provided, which includes the steps of:

S10: establish a first equation:

$$\theta(X,\tau) = \cosh(M-MX)\operatorname{sech}(M) + \sum_{n=1}^{N} -\frac{2\lambda_n}{M^2+\lambda_n^2}\sin(\lambda_n X)e^{-(M^2+\lambda_n^2)\tau}$$

wherein $$\lambda_n = \left(n-\frac{1}{2}\right)\pi, \; M = \sqrt{\frac{4h}{kD}}L,$$

X is a dimensionless axial coordinate, $\tau$ is a dimensionless time, N is a positive integer, $\lambda$ is a characteristic value, M is a ratio of heat conduction to convection intensity, h is a heat convection coefficient, and k is a heat transfer coefficient, D is a diameter of the pillar, L is a length of the pillar, t is a time;

S20: measure an instantaneous temperature and a steady-state temperature of the pillar;

S30: calculate the ratio of heat conduction to convection intensity according the instantaneous temperature and the steady-state temperature;

S40: calculate the dimensionless time based on the ratio of the heat conduction and the convection intensity, the instantaneous temperature and the steady-state temperature;

S50: introduce the ratio of the heat conduction to the convection intensity and the dimensionless time into the first equation;

S60: calculate the first equation to obtain a temperature prediction model.

In the diffusivity method for measuring a thermal diffusivity performance, the pillar is a heat pipe.

The foregoing, as well as additional objects, features and advantages of the invention will be more readily apparent from the following detailed description, which proceeds with reference to the accompanying drawings.

DESCRIPTION OF THE PREFERRED EMBODIMENTS

A system and diffusivity method for measuring a thermal diffusivity performance is provided in the present invention. The heat diffusivity performance of the pillar can be predicted by measuring instantaneous temperature and steady-state temperature of the pillar. In addition, in this specification, the pillar includes tubular, rod-shaped, linear and curved, and the material of the pillar can be metal and non-metal. The cross section of the pillar is round, square, or irregular shape. The pillar will be explained with a heat pipe as an example in following embodiment.

Figure 3:
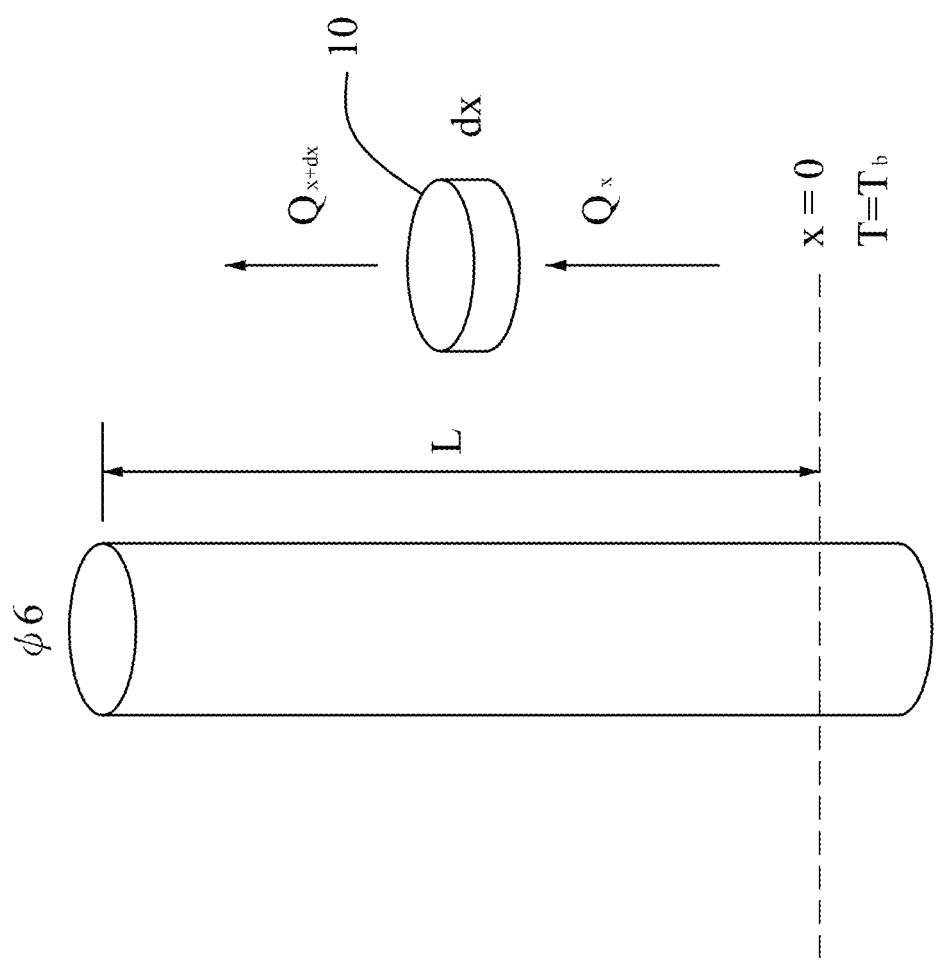
FIG. 3 shows a schematic diagram of the assumptions of the heat pipe.

The heat pipe temperature prediction model is established via a first equation in the present invention, and the first equation is derived from a heat conduction model of the heat pipe. Please refer the FIG. 3, the FIG. 3 shows a schematic diagram of the assumptions of the heat pipe. In this embodiment, the length of the heat pipe is long and the diameter is small so it can be assumed that the heat pipe is a one-dimensional heat conduction model, and the radiation effect can be ignored to simplify the analysis of the heat conduction model of the heat pipe. From the perspective of the energy balance of the infinitely long heat pipe, the net heat transfer energy of the section 10 is equal to the net heat exchange energy of the outer surface area plus the temperature rise of the section 10. Through some tedious mathematical manipulation and simplification, the final heat conduction partial differential equation (1) can be obtained as follows:

$$\frac{\partial^2 T}{\partial x^2} - \frac{4h}{kD}T = \frac{1}{\alpha}\frac{\partial T}{\partial t} \tag{1}$$

$$BCI\ \bar{T}(0, T) = (T_b - T_\infty)$$

$$BCII\ \frac{\partial}{\partial x}T(L, t) = 0$$

Where $\bar{T}=T-T_\infty$. The equation (1) can be made dimensionless by introducing the following dimensionless parameters:

$$X = \frac{x}{L},\ \theta = \frac{T - T_\infty}{T_b - T_\infty},\ M = \sqrt{\frac{4h}{kD}}L,\ \tau = \frac{\alpha t}{L^2},$$

where X is a dimensionless axial coordinate, θ is a dimensionless temperature, M is a ratio of heat conduction to convection intensity, and τ is a dimensionless time. T is a temperature, h is a thermal convection coefficient, K is a heat transfer coefficient, D is a diameter of the heat pipe, L is a length of the heat pipe, t is the time, α is a thermal diffusivity coefficient, and x is an axial coordinate. Multiply the thermal diffusivity coefficient α by the material density or heat capacity, and the thermal conductivity K can be obtained.

Next, the equation (1) can be transformed into dimensionless equation (2) as following:

$$\frac{\partial^2 \theta}{\partial x^2} - M^2\theta = \frac{\partial \theta}{\partial \tau} \tag{2}$$

$$BCI\ \theta(0, \tau) = 1$$

$$BCII\ \frac{\partial}{\partial x}\theta(1, \tau) = 0$$

$$IC\ \theta(X, 0) = 0$$

Next, by applying separation of variables into a space domain X and a time domain τ with the heat pipe at the initial ambient temperature (τ=0, T=T_∞), and then put the heat pipe into a liquid with a temperature of Tb. The final solution of equation (2) can be derived. The instantaneous state of the heat pipe can be predicted by comparing θ (X, τ), X and τ. Thus, through some complex mathematical manipulations, a first equation can be obtained as following:

$$\theta(X, \tau) = \cosh(M - MX)\operatorname{sech}(M) + \sum_{n=1}^{N} -\frac{2\lambda_n}{M^2 + \lambda_n^2}\sin(\lambda_n X)e^{-(M^2+\lambda_n^2)\tau}$$

Where $\lambda_n=(n-\frac{1}{2})\pi$, n=1, 2, 3 . . . λ is a characteristic value. N is a positive integer.

The ratio of the heat conduction to the convection intensity M can be calculated by measuring the steady-state temperature of the heat pipe after the first equation is obtained, and the dimensionless time τ from the measurement time point can be calculated by measuring the instantaneous temperature. Then, introduce the ratio of the heat conduction to the convection intensity M and the dimensionless time τ into the first equation, and the temperature prediction model of the heat pipe can be calculated.

For example, taking N equals 5 as an example, the first equation will become the following equation (3):

$$\theta(X, \tau) = \cosh(M - MX)\operatorname{sech}(M) - \frac{2\lambda_1}{M^2 + \lambda_1^2}\sin(\lambda_1)e^{-(M^2+\lambda_1^2)\tau} - \tag{3}$$

$$\frac{2\lambda_2}{M^2 + \lambda_2^2}\sin(\lambda_2)e^{-(M^2+\lambda_2^2)\tau} - \frac{2\lambda_3}{M^2 + \lambda_3^2}\sin(\lambda_3)e^{-(M^2+\lambda_3^2)\tau} -$$

$$\frac{2\lambda_4}{M^2 + \lambda_4^2}\sin(\lambda_4)e^{-(M^2+\lambda_4^2)\tau} - \frac{2\lambda_5}{M^2 + \lambda_5^2}\sin(\lambda_5)e^{-(M^2+\lambda_5^2)\tau}$$

Next, introduce the ratio of the heat conduction to the convection intensity M obtained by measuring and dimensionless time τ into the equation (3). Then, it is a complete curve model, that is, a temperature prediction model of the heat pipe. Through actual experiments, when N is equal to 5, the prediction accuracy has reached 99.7%. Therefore, in the batter embodiment, N is 3-5.

Figure 4A:
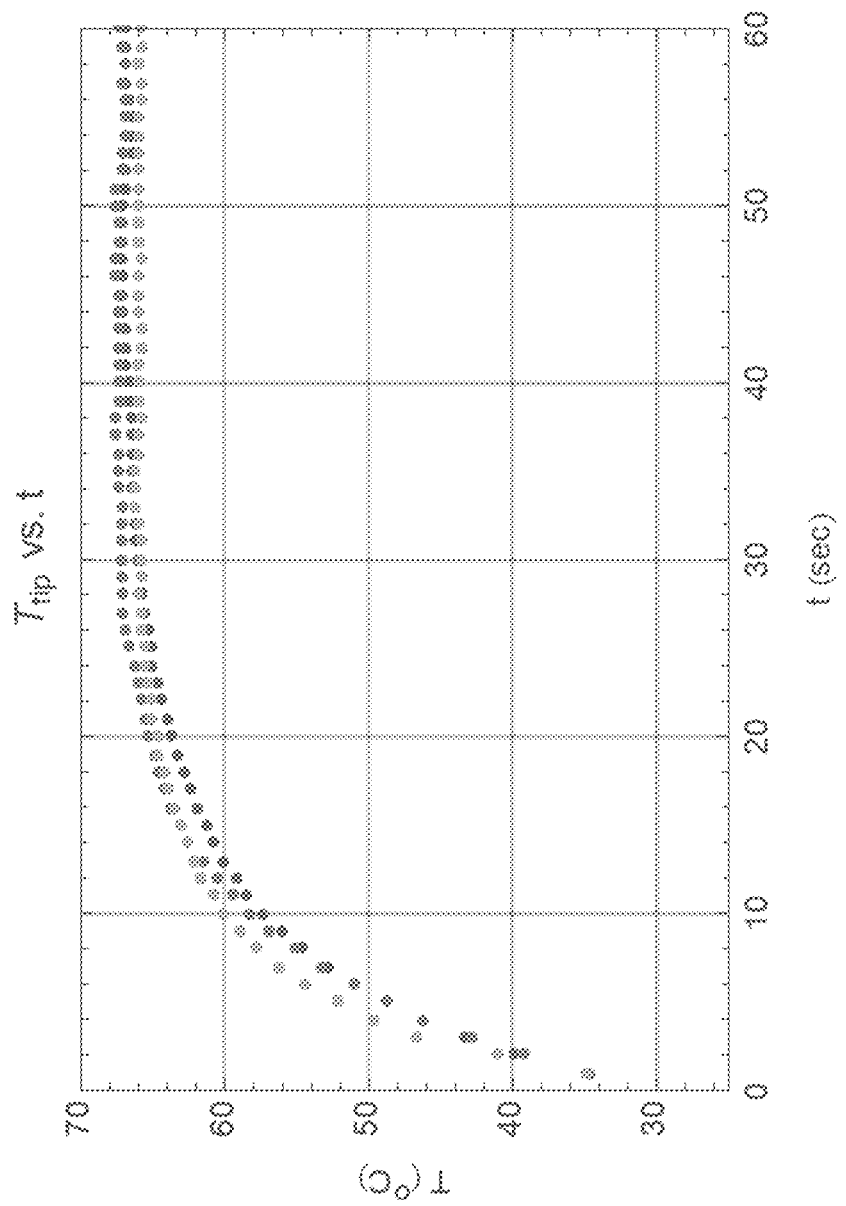
FIG. 4A shows a measurement results of the heat pipe temperature.
Figure 4B:
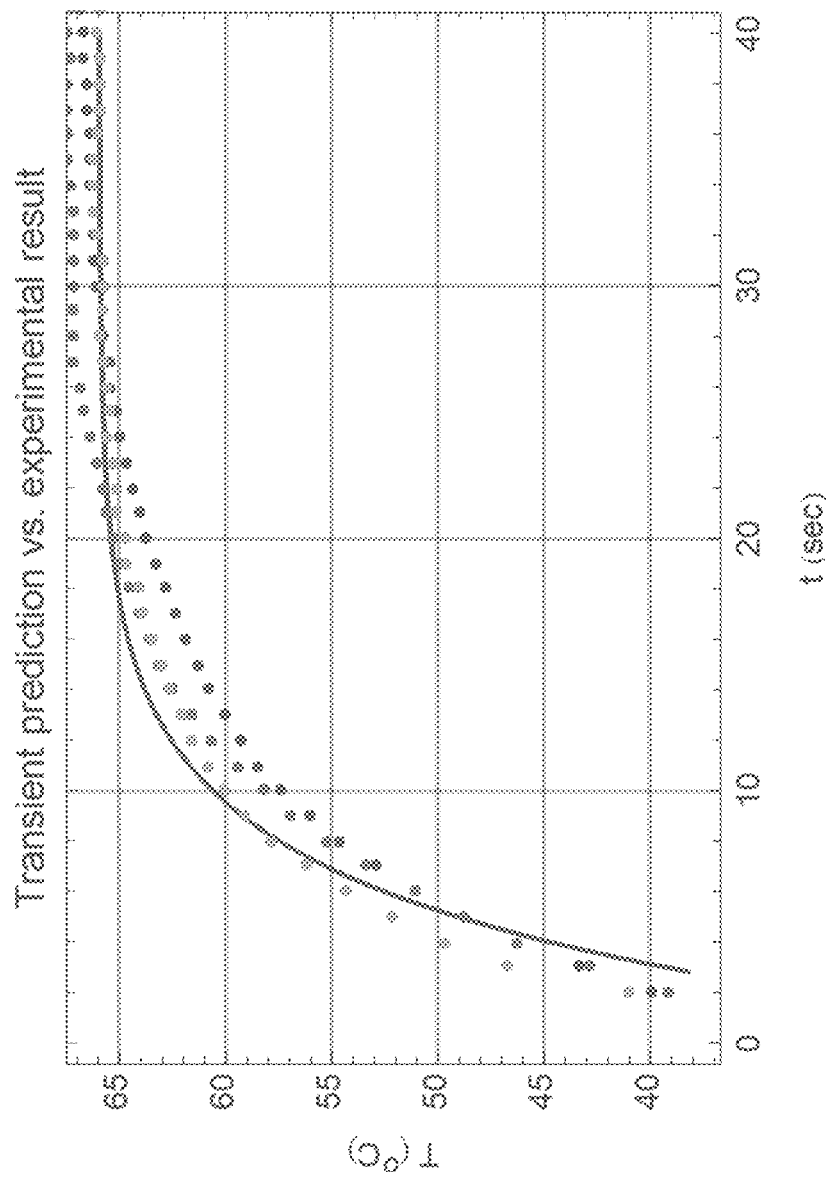
FIG. 4B shows a measurement result added the prediction curve.

Please FIG. 4A and FIG. 4B. FIG. 4A shows a measurement results of the heat pipe temperature. FIG. 4B shows a measurement result added the prediction curve. In the embodiment of the FIG. 4A, the conditions of the heat pipe are set to a diameter of 6 mm, a length of 250 mm, and an initial (t=0) temperature of 25° C. When the instant start (t>0), one end of the heat pipe is immersed in the liquid and heated. The measurement is recorded for about 60 seconds, and finally the heat pipe reaches a steady state. The temperature measured in FIG. 4A is the terminal temperature of the heat pipe Ttip. In the FIG. 4B, the deviation between the predictive value of the temperature prediction curve calculated by the first equation and the measured value is about 7%. The values in instantaneous are very consistent. Therefore, a system and diffusivity method for measuring a thermal diffusivity performance can be derived from the first equation.

Furthermore, through Fourier's law of thermal transfer Q=−KAdT/dx, integrate the heat conduction amount ∫Q dt in the instantaneous interval to obtain the instantaneous heat conduction temperature distribution with time. It can be used as a representative of heat transfer performance.

Figure 1:
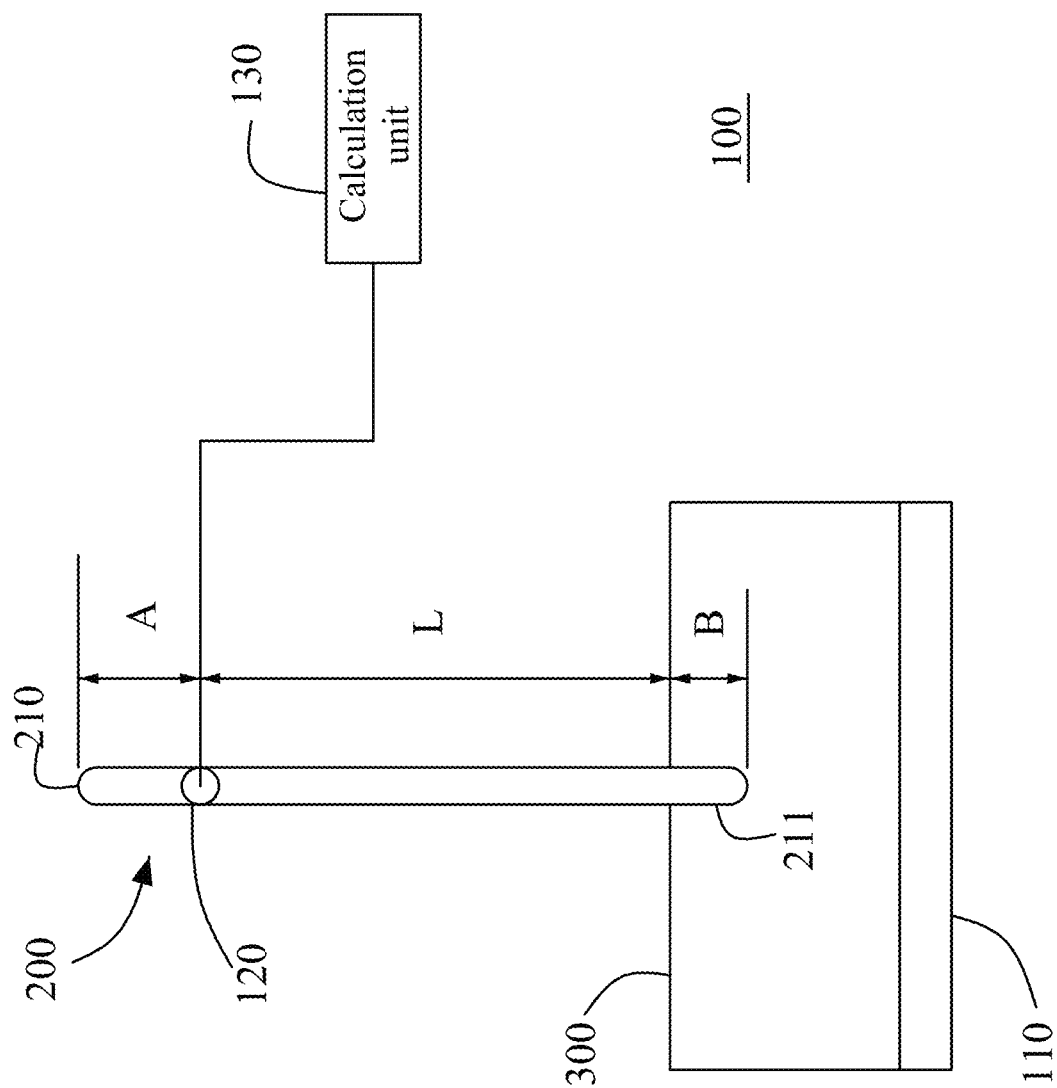
FIG. 1 shows a schematic diagram of the system of thermal diffusivity measurement.

Please refer FIG. 1. FIG. 1 shows a schematic diagram of the system of thermal diffusivity measurement. The system of thermal diffusivity measurement 100 includes a heater 110, a heat pipe 200, a temperature sensor 120 and a calculation unit 130. The heater 110 is used to heat the liquid 300. The heat pipe 200 includes a first end 210 and a second end 211, and the first end 210 is opposite to the second end 211. The second end 211 is deep into the liquid 300. The depth of deep is B, which is 50 mm in the preferred embodiment. In addition, in this embodiment, the heat pipe 200 is disposed vertically. However, it is not limited, the heat pipe 200 also can be disposed in the liquid 300 with other angle to simulate the layout of the heat pipe 200 in different environments.

The temperature sensor 120 is disposed at the first end 210 of the heat pipe 200. The distance between the temperature sensor 120 and the tip of the first end 210 is A, which is 15 mm in the preferred embodiment. The temperature sensor 120 is to measure the temperature of the heat pipe 200.

The calculation unit 130 is connected to the temperature sensor 120 and used to receive a plurality of measurement results of the temperature sensor 120 to calculate a temperature prediction model of the heat pipe 200. In this embodiment, the calculation unit 130 calculate the ratio of the heat conduction to the convection intensity M per unit conduction intensity and the dimensionless time $\tau$ according to the measurement result of the temperature sensor 120. The calculation equation of the ratio of the heat conduction to the convection intensity M and dimensionless time $\tau$ are as follows:

$$M = \sqrt{\frac{4h}{kD}} L, \tau = \frac{\alpha t}{L^2}$$

In above calculation equation of M and $\tau$, h is the heat convection coefficient, k is the heat transfer coefficient, D is the diameter of the heat pipe, L is the length of the heat pipe, and t is the time. The length of the heat pipe L is the distance between the temperature sensor 120 and the surface of the liquid 300. The ratio of the heat conduction to the convection intensity M can be obtained by measuring the steady-state temperature of the heat pipe 200, and the dimensionless time $\tau$ can be obtained by measuring the instantaneous temperature of the heat pipe 200.

After the ratio of the heat conduction to the convection intensity M and the dimensionless time $\tau$ are obtained, introduce the ratio of the heat conduction to the convection intensity M and the dimensionless time $\tau$ into the first equation as following:

$$\theta(X, \tau) = \cosh(M - MX)\text{sech}(M) + \sum_{n=1}^{N} -\frac{2\lambda_n}{M^2 + \lambda_n^2} \sin(\lambda_n X) e^{-(M^2 + \lambda_n^2)\tau}$$

In this embodiment, N is 3~5. After setting the N being 3~5, calculate the first equation. Then, the temperature prediction model of the heat pipe can be calculated.

Figure 2:
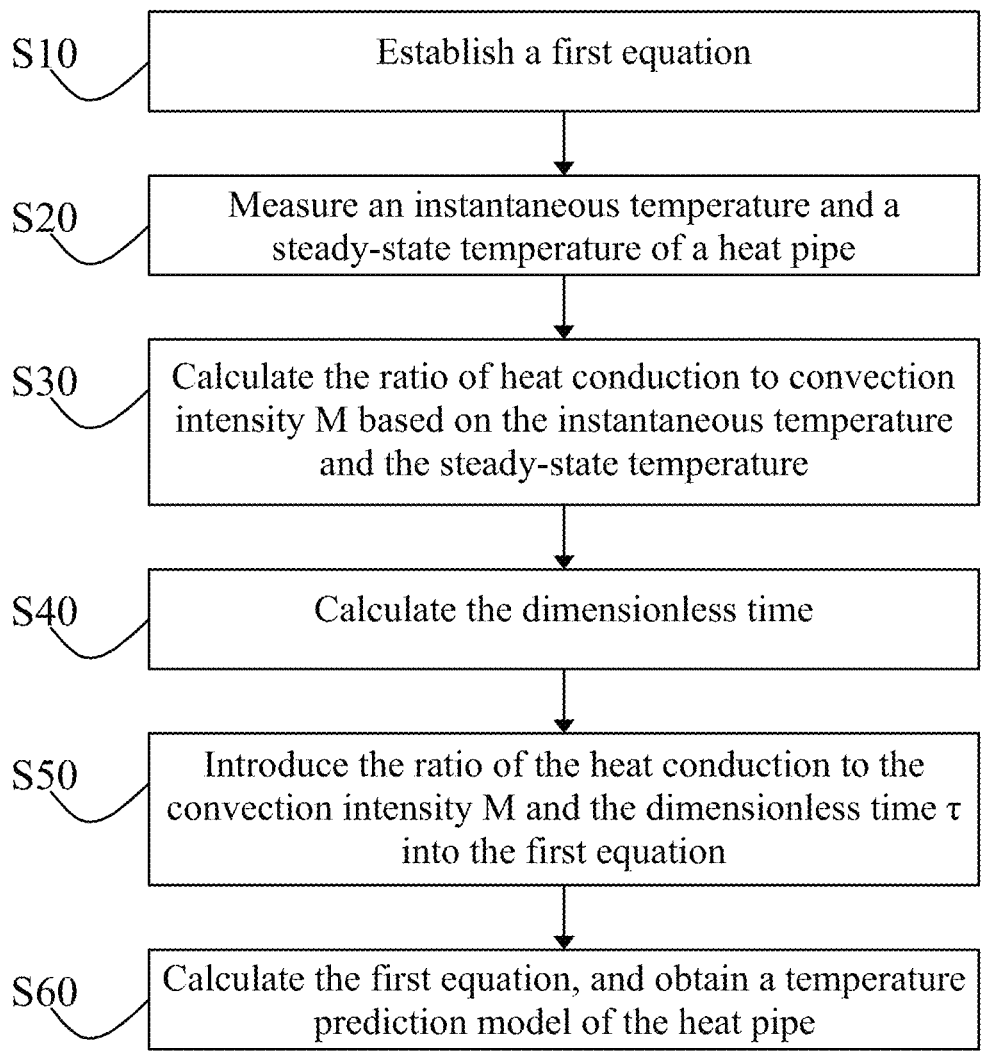
FIG. 2 shows a diffusivity method for measuring a thermal diffusivity performance of the present invention.

Therefore, please refer FIG. 2. FIG. 2 shows a diffusivity method for measuring a thermal diffusivity performance of the present invention. First, establish a first equation (step S10). Next, measure an instantaneous temperature and a steady-state temperature of a heat pipe (step S20). Next, calculate the ratio of heat conduction to convection intensity M according to the instantaneous temperature and the steady-state temperature (step S30). Next, calculate a dimensionless time $\tau$ (step S40). After the ratio of the heat conduction to the convection intensity M and the dimensionless time $\tau$ are obtained, introduce the ratio of the heat conduction to the convection intensity M and the dimensionless time $\tau$ into the first equation (step S50). Next, calculate the first equation, and then the temperature prediction model of the heat pipe can be calculated (step S60).

In the system and diffusivity method for measuring a thermal diffusivity performance of the present invention, the main advantages are fast and easy to use. The instantaneous temperature and steady-state temperature of the heat pipe can be obtained via simple water bath experiment, and the heat diffusivity and heat conduction performance of the heat pipe body can be calculated. Furthermore, the prediction error is also within 7%, which can more accurately predict the temperature change of the heat pipe.

While the preferred embodiment of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. A thermal diffusivity performance measurement system configured to measure a temperature of a pillar comprising:
    a heater, configured to heat the pillar;
    a temperature sensor, disposed at the pillar and measuring the temperature of the pillar; and
    a calculation unit, connected to the temperature sensor;
    wherein the calculation unit is to calculate a ratio of heat conduction to convection intensity per unit conduction intensity and a dimensionless time based on a plurality of measuring results of the temperature sensor;
    wherein the calculation unit introduces the ratio of the heat conduction to the convection intensity per unit conduction intensity and the dimensionless time into a first equation as following:

$$\theta(X, \tau) = \cosh(M - MX)\text{sech}(M) + \sum_{n=1}^{N} -\frac{2\lambda_n}{M^2 + \lambda_n^2} \sin(\lambda_n X) e^{-(M^2 + \lambda_n^2)\tau}$$

wherein $$\lambda_n = \left(n - \frac{1}{2}\right)\pi, \ M = \sqrt{\frac{4h}{kD}}\ L,$$

X is a dimensionless axial coordinate, $\tau$ is a dimensionless time, N is a positive integer, $\lambda$ is a characteristic value, M is a ratio of the heat conduction to the convection intensity, h is a heat convection coefficient, and k is a heat transfer coefficient, D is a diameter of the cylinder, L is a length of the pillar, t is a time, $\theta$ is a dimensionless temperature, $\alpha$ is a thermal diffusivity coefficient;

wherein the calculation unit calculates the ratio of the heat conduction to the convection intensity after measuring an instantaneous temperature and a steady-state temperature of the pillar via the temperature sensor, and then the calculation unit calculates the dimensionless time;

wherein the calculation unit introduces the ratio of the heat conduction to the convection intensity and the dimensionless time into the first equation, then the calculation unit obtains a temperature prediction model.

2. The thermal diffusivity performance measurement system of claim 1, wherein a range of the N is 3~5.

3. The thermal diffusivity performance measurement system of claim 1, wherein the pillar is a heat pipe.

4. The thermal diffusivity performance measurement system of claim 1, wherein the pillar is selected from a group consisting of tubular, rod-shaped, linear, and curve, and a cross-section of the pillar is selected from a group consisting of round, square, and irregular shape.

\* \* \* \* \*